UNITED STATES PATENT OFFICE.

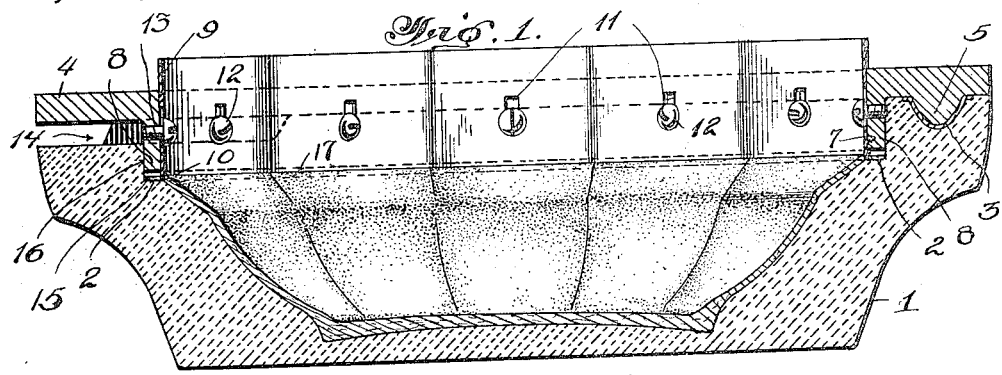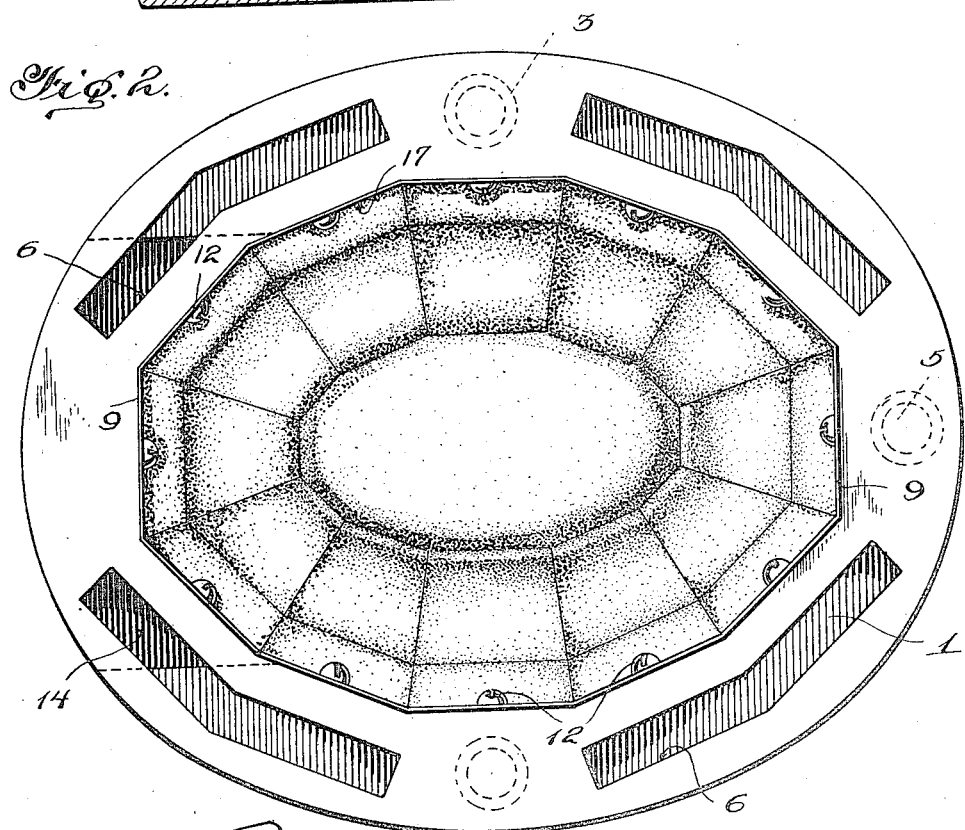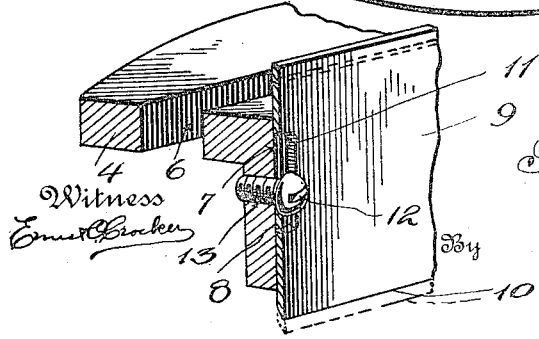

FRANK A. SEBRING AND FRANK STROBL, OF SEBRING, OHIO.

POTTER'S SCRAPPING DEVICE.

1,260,074. Specification of Letters Patent. Patented Mar. 19, 1918.

Application filed January 18, 1917. Serial No. 143,049.

*To all whom it may concern:*

Be it known that we, FRANK A. SEBRING and FRANK STROBL, citizens of the United States, residing at Sebring, in the county of Mahoning and State of Ohio, have invented a new and useful Potter's Scrapping Device, of which the following is a specification.

Our invention relates to potters' scrapping devices and has more especial reference to a portable device provided with a cutting blade and arranged to be placed over the mouth of a mold for the purpose of trimming the upper edge of the molded article.

This device relates more especially to the fluid clay or slip process, such as is employed in molding dishes, plates and the like. It is of course understood that molds of this character are left open upon their upper side in order that the slip may be poured into the mold, filling the same, and as these molds, like all others used in pottery, are preferably formed from plaster of Paris, they are very absorbent, hence the water contained in the slip is drawn into the walls of the mold and the clay thus rejected is deposited in an even coating over the entire interior of the mold. Time allows this coating to accumulate and when it has reached the proper thickness the remainder of the slip is poured out of the mold thus leaving the hollow molded article within the mold. The thickness of the molded article is determined by the length of time in which the slip is allowed to remain in the mold before being poured therefrom.

After the operation above described has been completed it will of course be understood that the edge of the molded article will naturally be more or less uneven and this edge is, in the old way, trimmed and smoothed by hand, the potter using a knife to trim off the scrap of the molded article.

The object of this invention is to provide a portable scrapping device which may be placed upon the open mouth of a mold to easily and readily trim the uneven edge formed around the molded article.

A further object is to provide a device of this character which will be inexpensive to manufacture and durable and which may be easily and readily moved from place to place when desired.

A still further object is to provide a scrapping device having an adjustable knife blade carried therein and arranged to simultaneously trim the entire edge of a dish or other molded article.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

In the accompanying drawings:

Figure 1 is a vertical longitudinal section through our improved scrapping device showing the same applied to a mold.

Fig. 2 is a top plan view of the same.

Fig. 3 is a fragmentary perspective view of a portion of the scrapping device showing the means of attaching the adjustable knife blade thereto.

Similar numerals of reference indicate corresponding parts throughout the several figures of the drawing.

Referring more especially to the construction illustrated in the accompanying drawing, the numeral 1 indicates the mold used in the present process, said mold being shaped to cast a dish therein, the top side of the mold being open, a horizontal shoulder 2 being formed around the upper edge of the molding surface of the mold. The mold shown in the drawings is provided with a plurality of sockets 3, the use of which will be hereinafter pointed out.

In molding pottery by this process the mold is poured full of slip to a point just above the shoulder 2, after which the mold is allowed to stand for several minutes during which a portion of the water contained in the slip is drawn into the walls of the mold, the clay thus rejected being deposited in an even coating over the interior of the mold. It will, of course, be understood that the length of time in which the slip is allowed to stand in the mold determines the thickness of the molded article. After the desired time has elapsed the balance of the slip is poured from the mold, leaving the hollow plate within the mold. It has been the usual custom to trim the edge of the molded article by means of a knife blade which is passed around the top of the mold trimming off the scrap and finishing the edge of the dish or other molded article. In the present invention a trimming device is provided which may be easily and quickly placed upon the open top of the mold, after the article has been molded as above described, to easily and quickly trim the edge of the dish or other article.

The trimming device comprises the frame 4 formed of any suitable metal, preferably aluminum, provided with a plurality of projections 5 arranged to register with the metal lined sockets 3, which are formed in the upper edge of the mold, said frame being provided with the cut away portions 6 forming grips or handles by means of which the frame may be carried from place to place and placed upon the mold. The inner edge 7 of the frame conforms to the shape of the edge of the dish or other molded article and a downwardly depending flange 8 is provided around said inner edge of the frame. The knife blade 9 comprises a thin strip of steel provided around its lower edge with the cutting edge 10, said strip being shaped to conform to the inner surface of the frame 4 and provided with a plurality of slots 11, through which the screws 12 are passed, said screws engaging suitable screw threaded apertures 13 in the flange 8.

After the article has been cast within the mold and the remaining slip has been poured from the mold through the cut out portion 14 the dish or other article will remain in the mold, the upper edge 15 of said molded article extending over the shoulder 2 of the mold and presenting a rough or ragged or uneven appearance. The trimming device is then placed upon the mold, the flange 8 of said device sliding against the inner wall 16 of the mold, the cutting edge 10 of the knife blade passing through the plastic clay at the upper edge 17 of the molding surface of the mold, thus trimming the scrap from the molded article and finishing and smoothing the edge of the article.

It will be seen that the projections 5, upon the frame, register with the metal lined sockets 3 within the upper edge of the mold as the frame is placed upon the mold. The slots 11 it will be understood are provided for the purpose of adjusting the knife blade within the frame for varying shapes or sizes of molds and also to take up any wear in the knife blade. The plastic clay is of such consistency that only the weight of the frame 4 is necessary to cause the blade to sever the thickness of clay trimming the scrap from the molded article in one rapid operation. The trimming device is then lifted from the mold and the molded article removed from the mold to be dried and afterward finished and burned in the usual manner. This trimming device not only produces a more finished and even edge upon the molded article but may be operated to trim or scrap the ware much more easily and quickly than with the old method thus saving time and labor.

We claim:

1. A scrapping device for pottery molds comprising a hollow frame provided with a downwardly disposed flange around its inner edge and a knife blade adjustably mounted upon said flange and arranged to trim the edge of the molded article when said frame is placed upon the mold.

2. In combination with an open mold for casting hollow pottery ware, and provided with an inturned shoulder near its open side, a scrapping device comprising a hollow frame provided with a downwardly disposed flange around its inner edge and a knife blade adjustably mounted upon said flange and arranged to contact with said shoulder to trim the edge of the molded article when the frame is placed upon the mold.

In testimony that we claim the above, we have hereunto subscribed our names.

FRANK A. SEBRING.
FRANK STROBL.

Copies of this patent may be obtained for five cents each, by addressing the "Commissioner of Patents, Washington, D. C."